United States Patent [19]

Dunsirn et al.

[11] Patent Number: 4,479,838

[45] Date of Patent: Oct. 30, 1984

[54] COUPON STRUCTURE AND METHOD OF USING THE SAME

[75] Inventors: Robert J. Dunsirn, Appleton; Duane R. Dunsirn, Neenah, both of Wis.

[73] Assignee: Mid America Tag & Label Company, Inc., Neenah, Wis.

[21] Appl. No.: 390,976

[22] Filed: Jun. 22, 1982

[51] Int. Cl.³ .................... B32B 31/04; B32B 31/12; B42D 15/00

[52] U.S. Cl. .................... 156/247; 283/79; 283/80; 283/81; 40/630; 428/352

[58] Field of Search .............. 283/81, 79, 80; 428/40, 428/355, 352, 354; 40/630; 156/233, 247, 277, 289, 344

[56] References Cited

U.S. PATENT DOCUMENTS

| | | | |
|---|---|---|---|
| 2,783,172 | 2/1957 | Avery | 154/46.8 |
| 3,252,234 | 5/1966 | Goodman | 40/2 |
| 3,420,364 | 1/1969 | Kennedy, Jr. | 206/56 |
| 3,466,218 | 9/1969 | Avery | 161/33 |
| 3,524,783 | 8/1970 | Buske | 156/248 |
| 3,635,746 | 1/1972 | Karian | 117/3.1 |
| 3,808,718 | 5/1974 | Christiansen | 40/2 R |
| 4,060,168 | 11/1977 | Romagnoli | 206/216 |
| 4,188,250 | 2/1980 | Grass | 156/253 |
| 4,188,251 | 2/1980 | Grass | 156/248 |
| 4,246,058 | 1/1981 | Reed | 156/183 |
| 4,281,762 | 8/1981 | Hattemer | 206/390 |
| 4,398,985 | 8/1983 | Eagon | 156/233 |

*Primary Examiner*—Paul A. Bell
*Attorney, Agent, or Firm*—Isaksen, Lathrop, Esch, Hart & Clark

[57] ABSTRACT

A coupon structure (10) having a base sheet (12) having upper and under sides (14, 16). The base sheet (12) is adapted to be substantially nonreleasably adhered by its underside (16) to a selected mounting surface (20). A removable top sheet (18) is releasably adhered to the upper side (14) of the base sheet (12) by a substantially transparent layer of dry residue adhesive (24). Consequently, the top sheet (18) can be removed to leave a non-tacky base sheet (12). The base sheet may be transparent, allowing the mounting surface (20) to be observed therethrough substantially without visual obstruction. The removed top sheet (18) is dry, non-tacky, and visually unobstructed by adhesive residue on both sides thereof. The base sheet (12) may be releasably mounted on a backing web (30) for convenient storage until used.

23 Claims, 3 Drawing Figures

COUPON STRUCTURE AND METHOD OF USING THE SAME

TECHNICAL FIELD

The present invention relates to coupon structures and particularly to coupons adapted to be releasably attached to the surface of a package, letter, or other mounting surface.

BACKGROUND ART

The prior art is generally cognizant of coupons and the like adapted to be attached to the surface of packages or to some other convenient surface in such a way that the coupon can be removed intact. Commonly, such coupon structures are used as store coupons that are attached to the product on the shelf and are detached and used by the consumer at the time of purchase. In other instances, comparable coupon structures are used when membership or identification cards and the like are sent to recipients attached to a letter or other mailing. The recipient then removes the card from the mailing for use.

It is desirable that the removed coupon or card not be tacky on either side. This result can be achieved by applying the coupon or card to a base sheet having a pressure sensitive release adhesive. The base sheet may in turn be attached to the desired mounting surface by a suitable adhesive. The user subsequently can detach the coupon or card by peeling it from the base sheet. A disadvantage of this method, however, is that a layer of pressure sensitive adhesive material remains exposed on the product or mailing after the removal of the coupon or card. This tacky material is an annoyance or practical disadvantage in many instances.

It is possible to avoid leaving a tacky surface of the sort referred to by having the coupon or card attached along a perforated line to side portions of the same material on which the coupon or card is printed. The side portions may then be permanently secured to the underlying base sheet with a suitable adhesive, with no adhesive applied to the coupon or card itself. A user may then remove the coupon or card at the perforated line without exposing any adhesive, leaving the base sheet permanently attached to the product, mailing, or other mounting surface. Hattemer, U.S. Pat. No. 4,281,762, shows an example of such a coupon structure. However, both this method and the first prior art method referred to above result in a section of base sheet being left behind on the mounting surface. The base sheet may be unsightly or interfere with printed material on the mounting surface by visually obstructing it.

Accordingly, a need exists for a coupon structure in which a store coupon, membership card, or the like may be removably attached to a mounting surface in such a way that the coupon or card will not be tacky on either side when removed and no sticky surface or layer of material that visually obstructs the underlying mounting surface remains after the coupon or card is removed.

DISCLOSURE OF THE INVENTION

The present invention is summarized in that a coupon structure includes a base sheet having upper and under sides. The base sheet is preferably made of a substantially transparent sheet material and is adapted to be substantially nonreleasably adhered by its under side to a mounting surface. A removable top sheet is releasably adhered to the upper side of the base sheet by a substantially transparent coating of dry residue adhesive, whereby, after the base sheet is applied to the mounting surface, the top sheet can be removed to leave a non-tacky base sheet. The mounting surface then may be observed through a transparent base sheet substantially without visual obstruction, or a non-transparent base sheet may be covered with printing or decoration first visible when the top sheet is removed. The removed top sheet is dry, non-tacky, and visually unobstructed by adhesive residue on both sides thereof.

The method of the invention is summarized in that a method for removably mounting a top sheet on a mounting surface includes the steps of applying a pressure sensitive adhesive to the under side of a base sheet and releasably adhering a top sheet to the upper side of the base sheet with a dry residue adhesive adapted to leave a substantially transparent, non-tacky residue when the top sheet is removed from the base sheet. The method further includes applying the base sheet with adhered top sheet to the mounting surface with pressure sufficient to adhere the pressure sensitive adhesive thereto, whereby the top sheet may be removed from the base sheet with both sides of the coupon non-tacky and visually unobstructed by adhesive, leaving the base sheet adhered to the mounting surface. It is preferred that the base sheet is transparent, so that the mounting surface is visually unobstructed thereby.

A primary object of the invention is to provide a coupon structure in which a coupon, membership card, or the like may be releasably attached to a product, mailing, or other mounting surface.

A second object of the invention is to provide a means for so mounting such a coupon, membership card, or the like wherein the mounting surface is visually unobstructed by any remaining parts of the coupon structure when the coupon, membership card, or the like has been removed.

A further object of the invention is to provide a means for releasably mounting a coupon, membership card, or the like to a selected mounting surface such that, when the coupon or membership card has been removed, the mounting surface is dry and has no tacky material thereon.

A further object of the invention is to provide for the releasable mounting of a coupon, membership card, or the like on a mounting surface such that both sides of the coupon or membership card are non-tacky and visually unobstructed when removed from the mounting surface.

Other objects, features, and advantages of the invention will be apparent from the following detailed description taken in conjunction with the accompanying drawings showing a preferred embodiment of a coupon structure exemplifying the principles of the invention.

BEST MODE FOR CARRYING OUT THE INVENTION

Figure 1:
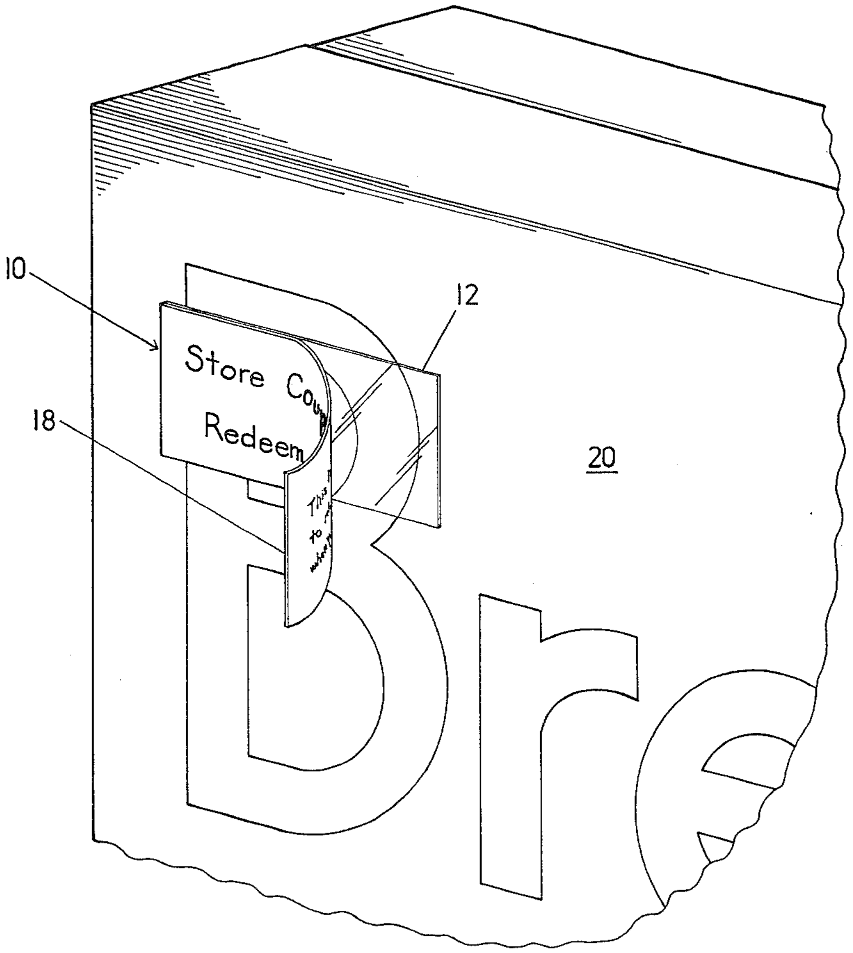
FIG. 1 is a perspective view of a coupon structure made in accord with the invention mounted on a product box.
Figure 2:
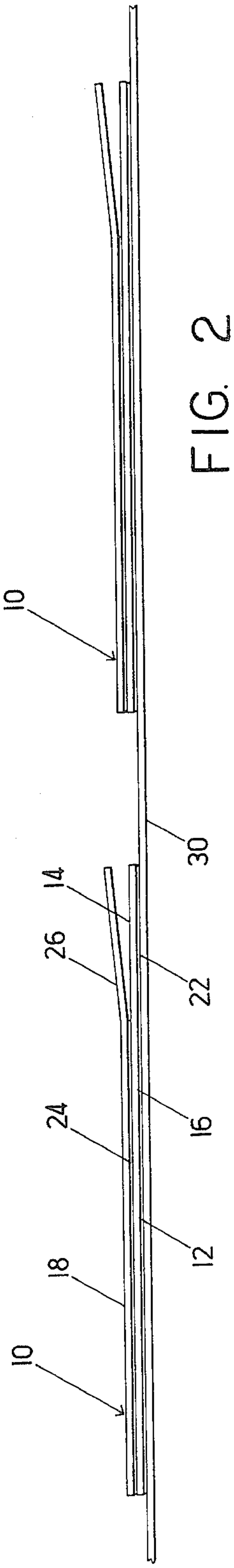
FIG. 2 is a cross section of a coupon structure made in accord with the invention mounted on a backing web.

Referring more particularly to the drawings, wherein like numbers refer to like parts, FIGS. 1 and 2 show a coupon structure, generally indicated at 10, constructed in accord with the present invention. The coupon structure 10 has a base sheet 12 having upper and under sides 14, 16. A removable top sheet 18 is releasably adhered to the upper side 14 of the base sheet 12 with a dry residue adhesive 24, discussed further below. The under side 16 of the base sheet 12 is adapted to be substantially non-releasably adhered to a mounting surface 20. Thus, with a base sheet 12 so adhered to the mounting surface 20, the top sheet 18 may be removed therefrom, leaving the base sheet behind. After such removal of the top sheet 18, all exposed surfaces of the removed top sheet and the adhered base sheet 12 are dry and non-tacky.

The base sheet 12 is preferably made of a substantially transparent and non-porous sheet material. Two mil thick, clear acetate sheet material having a substantially smooth upper side 14 is preferred, but any generally smooth sheet material is within the scope and spirit of the invention.

Preferably the base sheet 12 is adapted to be adhered to a mounting surface 20 by a layer of a substantially transparent pressure sensitive adhesive 22 applied to the under side 16 of the base sheet 12. Preferably, the base sheet 12 is adhered to the mounting surface 20 with sufficient strength that the base sheet will remain attached to the mounting surface during the period of customary use of the mounting surface. The selection and application of such a pressure sensitive adhesive is well within the ability of a person skilled in the art. The particular adhesive 22 selected will depend upon characteristics of the mounting surface 20 and the anticipated conditions of use to which the mounting surface will be subjected.

As disclosed above, the top sheet 18 is releasably adhered to the upper side 14 of the base sheet 12 by a substantially transparent layer of dry residue adhesive 24 having selected adhesive strength. The term "dry residue adhesive" as used herein shall refer to an adhesive that may be incorporated in the coupon structure 10 and is dry and non-tacky when the coupon structure is ready for use. The pressure sensitive adhesive 22, dry residue adhesive 24, base sheet 12, and top sheet 18 are so selected that the adhesion of the base sheet to the mounting surface 20 is greater than the adhesion of the top sheet to the base sheet. Furthermore, the internal cohesion of the top sheet 18 and the cohesion of the base sheet 12 are greater than the adhesion of the top sheet to the base sheet. Consequently, the top sheet 18 may be removed from the base sheet 12 without tearing or otherwise destroying either sheet and without removing the base sheet from the mounting surface 20.

Figure 3:
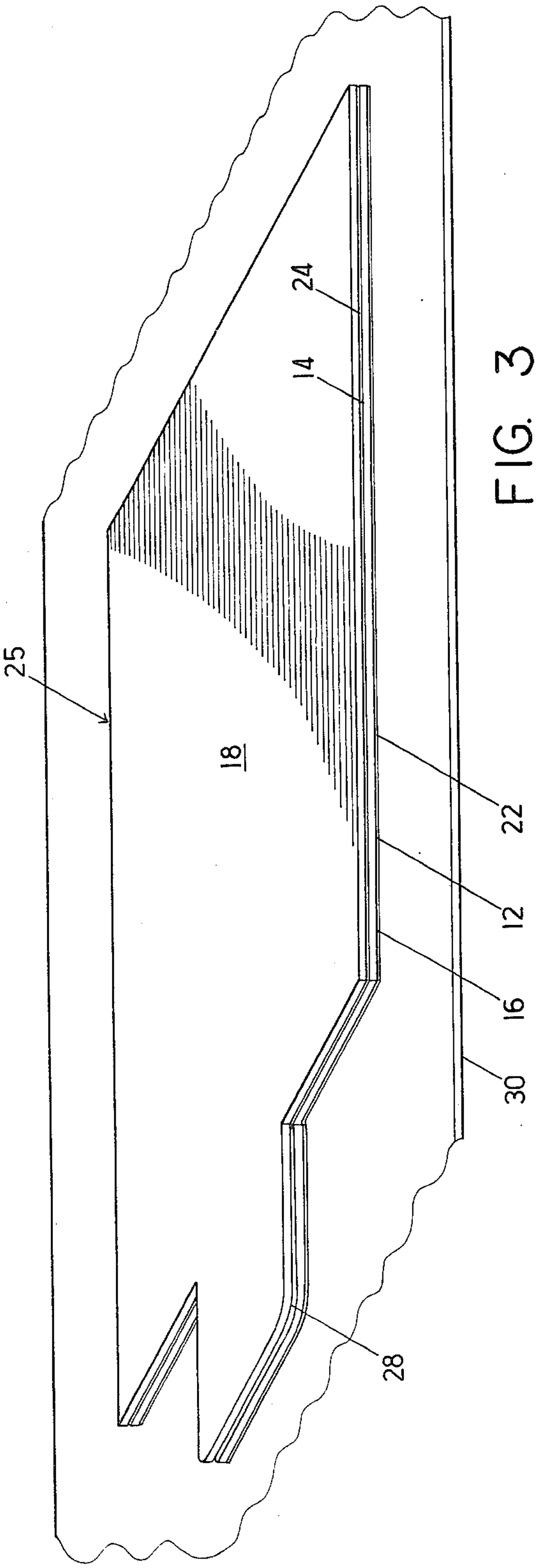
FIG. 3 is a perspective view of another embodiment of the coupon structure of the invention mounted on a backing web.

Preferably, a selected portion 26 of the top sheet 18 forming a part of the margin of the top sheet is not adhered to the base sheet 12, as is illustrated in FIG. 2. The unadhered portion 26 forms a tab for the convenient grasping of the top sheet 18. Although the selected portion 26 may be at any convenient part of the margin of the top sheet 18, when the top sheet is substantially rectangular, a corner of the top sheet is preferred. Alternatively, a selected extension portion 28 of the top sheet 18 may be made to extend beyond the main body of the top sheet, and be unadhered to a corresponding underlying extension portion of the base sheet to form a tab for grasping the top sheet, as is illustrated in the alternative embodiment of the invention shown generally at 25 in FIG. 3. All parts of the embodiment indicated at 25 corresponding to parts of the embodiment indicated at 10 are given like numbers and will not be described separately.

In certain situations, it is convenient that the coupon structure 10 include a backing web 30. The backing web 30 has a release surface such that the pressure sensitive adhesive 22 adheres to the backing web 30 less strongly than it adheres to the under side 16 of the base sheet 12. The base sheet 12 and associated top sheet 18 adhered thereto may be stored until used by applying the under side 16 of the base sheet bearing the pressure sensitive adhesive 22 to the release surface of the backing web 30. Subsequently, a user may peel the base sheet 12 from the backing web 30 and then apply the under side 16 of the base sheet to a selected mounting surface 20. The backing web 30 may then be disposed of. A single base sheet 12 and associated top sheet 18 may be mounted on a given portion of backing web 30 or, alternatively, multiple base sheets and top sheets may be mounted on a single backing web, as is shown in FIG. 2.

The method of the invention for removably mounting a top sheet 18 on a mounting surface 20 includes removing the backing web 30, if any, from the coupon structure 10 or from the coupon structure 25, and applying the pressure sensitive adhesive 22 to the selected mounting surface 20. The base sheet 12 must be applied to the mounting surface 20 with pressure sufficient to adhere the pressure sensitive adhesive 22 thereto. Thereafter, the top sheet 18 may be removed from the base sheet 12 with both sides of the top sheet non-tacky and visually unobstructed by adhesive. The base sheet 12, which is preferably transparent, remains adhered to the mounting surface 20. Because the base sheet 12 and pressure sensitive adhesive 22 are themselves transparent, and because any residue of the dry residue adhesive 24 is likewise transparent, the mounting surface is visually unobstructed thereby. Thus, any printed material, attractive design, or color is unobscured thereby and the mounting surface 20 retains substantially the same appearance that it had before application of the base sheet and associated top sheet 18 thereto.

If a base sheet which is not transparent is used, the surface of the base sheet may be printed or decorated so that this printing or decoration is exposed when the top sheet is removed.

The top sheet 18 of the coupon structure 10 may be made of any convenient material. Thus, when the coupon structure 10 is used to provide a store coupon or the like to be attached to a product or packaging, such as the box shown in FIG. 1, the top sheet 18 may conveniently be made of flexible paper of a selected thickness. In contrast, stiffer paper, cardboard, or selected plastics could be used to make the top sheet 18 and be suitable for use as membership cards or identification cards attached to the face of a letter, certificate, or other desired mounting surface 20. Because the dry residue adhesive 24 is transparent, both sides of the top sheet 18 are visually unobscured by any adhesive residue when the top sheet is removed from the base sheet 12. Consequently, printed material, designs, or attractive colors on either side of the top sheet 18 are neither obscured nor disfigured.

The dry residue adhesive 24 is particularly selected to be substantially transparent when applied in the thicknesses necessary to have the relative adhesive qualities specified above may be used as the dry residue adhesive 24 of the invention.

One adhesive which has been found to have the desired combination of properties is an ethylene - vinyl acetate copolymer latex. A specific example of such an adhesive is an aqueous dispersion containing approximately 60% solids by weight, comprising approximately 22.4% ethylene and 77.6% vinyl acetate, and preferably including a cross-linking agent and potassium peroxide or other inorganic peroxide.

In the preferred process, the foregoing adhesive is diluted until a 9-second reading is obtained on a No. 2 Zahn Cup. The diluted adhesive is then applied to the upper side 14 of the base sheet 12 with an anilox roller having 200 lines per inch, and the top sheet 18 is then applied to the adhesive coated surface. The adhesive dries to a non-tacky state, providing controlled adhesion between the top sheet and base sheet which is sufficient to keep the sheets together in normal transport and storage, but allows the sheets to be readily parted by a consumer without tearing of the top sheet. It is preferred that the adhesive chosen will cure to a state in which it will not be activated by moisture.

It is understood that the present invention is not limited to the particular construction and arrangement of parts illustrated and disclosed, nor to the material specified, nor to the particular steps disclosed herein, but embraces such modified forms thereof as come with the scope of the following claims.

What is claimed is:

1. A method for removably mounting a coupon on a mounting surface, the method comprising the steps of:
 (a) applying an adhesive to the under side of a base sheet;
 (b) releasably adhering a top sheet to the upper side of the base sheet with a dry residue adhesive not activated by moisture adapted to leave a substantially transparent, non-tacky residue when the top sheet is removed from the base sheet, the top sheet, base sheet and dry residue adhesive selected such that the internal cohesion of the top sheet and base sheet are greater than the adhesion of the top sheet to the base sheet; and
 (c) applying and adhering the base sheet with adhered top sheet to the mounting surface with greater adhesion of the base sheet to the mounting surface than the adhesion of the top sheet to the base sheet, whereby the top sheet may be removed from the base sheet with both sides of the top sheet non-tacky and visually unobstructed by adhesive, leaving the base sheet adhered to the mounting surface.

2. The method for removably mounting a coupon on a mounting surface specified in claim 1 including, after the step of applying a pressure sensitive adhesive to the under side of a substantially transparent base sheet, the step of applying the under side of the base sheet bearing the pressure sensitive adhesive to a backing web that is at least substantially coextensive with the base sheet, whereby the step of applying the base sheet with adhered top sheet to the mounting surface may be conveniently postponed without deterioration of the pressure sensitive adhesive and without accidental application of the base sheet to surfaces other than the desired mounting surface.

3. The method for removably mounting a coupon on a mounting surface specified in claim 1 wherein the step of releasably adhering a top sheet to the upper side of the base sheet includes maintaining a selected portion of the top sheet at a selected part of its margin free of any adhesive and therefore not adhered to the base sheet, whereby the unadhered portion forms a tab that may be conveniently grasped in peeling the top sheet away from the base sheet.

4. The method for removably mounting a coupon on the mounting surface specified in claim 1 wherein the step of releasably adhering a top sheet to the upper side of the base sheet includes extending a selected extension portion of the top sheet beyond the base sheet to form a tab unadhered to any surface, which tab may be conveniently grasped in peeling the top sheet away from the base sheet.

5. The method of claim 1 wherein the step of releasably adhering the top sheet to the base sheet includes applying liquid adhesive to the upper side of the base sheet, applying the top sheet to the base sheet with liquid adhesive thereon, and drying the liquid adhesive, the liquid adhesive comprising an aqueous dispersion of an ethylene-vinyl acetate copolymer latex, the amount of copolymer latex applied to the base sheet being selected such that the adhesion of the top sheet to the base sheet after drying of the liquid adhesive is less than the adhesion of the base sheet by the pressure sensitive adhesive to the mounting surface.

6. A method of making a coupon structure comprising the steps of:
 (a) providing a backing web with a release surface;
 (b) providing a base sheet having upper and under sides;
 (c) applying pressure sensitive adhesive to the under side of the base sheet;
 (d) applying a layer of liquid adhesive to the upper side of the base sheet, the adhesive being capable of drying to a non-tacky, substantially transparent dry residue state not activated by moisture;
 (e) applying a top sheet to the upper side of the base sheet having the liquid adhesive thereon;
 (f) drying the liquid adhesive to a solid, non-tacky state, the top sheet, base sheet, and dry residue adhesive selected such that the internal cohesion of the top sheet and base sheet are greater than the adhesion of the top sheet to the base sheet; and
 (g) applying the under side of the base sheet with the pressure sensitive adhesive thereon to the release surface of the backing web to removably adhere the base sheet thereto.

7. The method of making a coupon structure specified in claim 6 wherein the step of applying a top sheet to the upper side of the base sheet includes extending a selected portion of the top sheet beyond the body of the top sheet to form a tab unadhered to the base sheet for grasping the top sheet.

8. The method of making a coupon structure specified in claim 6 wherein the step of applying a layer of liquid adhesive to the upper side of the base sheet includes maintaining a selected portion of the base sheet at a selected part of its margin free from any liquid adhesive, and the step of applying a top sheet to the upper side of the base sheet includes extending the top sheet over the portion of the base sheet maintained free of liquid adhesive, whereupon a selected portion of the top sheet will remain unadhered to the base sheet to form a tab for the convenient grasping of the top sheet.

9. The method of claim 6 wherein the liquid adhesive applied to the upper side of the base sheet comprises an aqueous dispersion of an ethylene-vinyl acetate copolymer latex, the amount of copolymer latex applied to the base sheet being selected such that the adhesion of the top sheet to the base sheet after drying of the liquid adhesive is less than the adhesion of the base sheet by the pressure sensitive adhesive to a selected mounting surface.

10. A coupon structure comprising:

(a) a non-transparent base sheet having upper and under sides with printed material on its upper side, and adapted to be substantially nonreleasably adhered by its under side to a mounting surface; and (b) a removable top sheet releasably adhered to the upper side of the base sheet by a substantially transparent layer of dry residue adhesive not activated by moisture, the top sheet having printed material on both sides thereof, such that, after the base sheet is applied to the mounting surface, the top sheet can be removed to leave a non-tacky base sheet, the removed top sheet being dry and non-tacky, and the printed material on the top sheet and base sheet being visually unobstructed by adhesive residue.

11. The coupon structure specified in claim 10, including a substantially transparent pressure sensitive adhesive applied to the under side of the base sheet and adapted to non-releasably adhere the base sheet to the mounting surface.

12. The coupon structure specified in claim 11 including a backing web on which the base sheet and associated top sheet are stored until used, and wherein the pressure sensitive adhesive releasably adheres to the backing web, whereby a user may peel the base sheet from the backing web and then apply the under side of the base sheet to a selected mounting surface.

13. The coupon structure specified in claim 10 wherein the dry residue adhesive comprises a copolymer of ethylene and vinyl acetate formed from an aqueous dispersion having approximately 60% solids by weight comprising approximately 22.4% ethylene and 77.6% vinyl acetate.

14. The coupon structure specified in claim 10 wherein the top sheet includes a selected portion thereof at a selected part of its margin that is not adhered to the base sheet, whereby the unadhered portion forms a tab for the convenient grasping of the top sheet.

15. The coupon structure specified in claim 10 wherein a selected extension portion of the top sheet extends from the body of the top sheet and is not adhered to the base sheet to form a tab for grasping the top sheet.

16. A coupon structure comprising:

(a) a base sheet having an upper and under side;

(b) a backing web at least coextensive with the base sheet;

(c) a pressure sensitive adhesive applied to the under side of the base sheet releasably adhering it to the backing web and adapted to nonreleasably adhere the base sheet to a selected mounting surface;

(d) a removable top sheet having an upper side and an under side;

(e) a substantially transparent layer of dry residue adhesive comprising a copolymer of ethylene and vinyl acetate between the under side of the top sheet and the upper side of the base sheet releasably adhering the top sheet thereto, the dry residue adhesive being selected not to be activated by moisture and in a thickness to leave a substantially transparent, non-tacky residue when the top sheet is removed from the base sheet, the pressure sensitive adhesive, dry residue adhesive, top sheet and base sheet selected such that the adhesion of the base sheet to a mounting surface is greater than the adhesion of the top sheet to the base sheet, and wherein the internal cohesion of the top sheet and base sheet are greater than the adhesion of the top sheet to the base sheet, whereby the top sheet and associated base sheet may be peeled as a unit from the backing web and applied to a selected mounting surface, whereafter the top sheet may be removed from the base sheet to leave a non-tacky sheet, the upper and under sides of the removed top sheet being non-tacky and visually unobstructed.

17. The coupon structure of claim 16 wherein the base sheet is made of a substantially transparent material.

18. The coupon structure of claim 16 wherein the dry residue adhesive comprises a copolymer of ethylene and vinyl acetate.

19. The coupon structure of claim 16 wherein the top sheet has printed material on both sides thereof which is visually unobstructed when the top sheet is removed from the base sheet.

20. The coupon structure specified in claim 16 wherein the base sheet is made of clear acetate.

21. The coupon structure specified in claim 16 wherein the top sheet includes a selected portion thereof at a selected part of its margin that is not adhered to the base sheet, whereby the unadhered portion forms a tab for the convenient grasping of the top sheet.

22. The coupon structure specified in claim 14 wherein a selected portion of the top sheet extends from the body of the top sheet and is not adhered to the base sheet to form a tab for grasping the top sheet.

23. The coupon structure specified in claim 16 wherein the top sheet is formed from fiberous sheet material of selected stiffness having internal cohesion greater than its adhesion to the base sheet.

* * * * *

UNITED STATES PATENT AND TRADEMARK OFFICE

CERTIFICATE OF CORRECTION

PATENT NO. : 4,479,838

DATED : October 30, 1984

INVENTOR(S) : Robert J. Dunsirn, Duane R. Dunsirn

It is certified that error appears in the above-identified patent and that said Letters Patent are hereby corrected as shown below:

Claim 22, Column 8, line 46, "Claim 14" should read --Claim 16--.

Signed and Sealed this

*Thirtieth* Day of *April 1985*

[SEAL]

*Attest:*

DONALD J. QUIGG

*Attesting Officer* *Acting Commissioner of Patents and Trademarks*